US006580556B2

(12) United States Patent
Kakizawa

(10) Patent No.: US 6,580,556 B2
(45) Date of Patent: Jun. 17, 2003

(54) VIEWING STEREOSCOPIC IMAGE PAIRS

(75) Inventor: Akira Kakizawa, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 09/726,759

(22) Filed: Nov. 29, 2000

(65) Prior Publication Data
US 2002/0063957 A1 May 30, 2002

(51) Int. Cl.[7] .............................. G02B 27/22; H04N 7/14
(52) U.S. Cl. ........................ 359/462; 359/464; 359/466; 348/15
(58) Field of Search ................................. 359/462, 464, 359/466, 471, 472, 477; 348/468, 51, 57, 14.01, 15

(56) References Cited

U.S. PATENT DOCUMENTS

| | | | | |
|---|---|---|---|---|
| 3,891,303 A | * | 6/1975 | Barquero | 359/466 |
| 5,774,261 A | * | 6/1998 | Omori et al. | 359/466 |
| 5,777,720 A | * | 7/1998 | Shapiro et al. | 351/237 |
| 6,275,251 B1 | * | 8/2001 | Hartman et al. | 348/14.01 |

* cited by examiner

*Primary Examiner*—Audrey Chang
(74) *Attorney, Agent, or Firm*—Troy, Pruner & Hu, P.C.

(57) ABSTRACT

A stereoscopic image pair may be viewed through a plate having an appropriately-sized aperture. When the viewer's left and right eyes view the image pair through the aperture, a stereoscopic effect may result. In one embodiment, a stereoscopic video conference system may include stereoscopic cameras positioned between the viewer and the apertured plate.

14 Claims, 4 Drawing Sheets

VIEWING STEREOSCOPIC IMAGE PAIRS

BACKGROUND

This invention relates to techniques and apparatus for stereoscopically viewing images.

A variety of techniques are available for viewing stereoscopic image pairs. In some cases, a pair of left and right images may be creating using a variety of well known techniques. Those image pairs may then be viewed stereoscopically to create the impression of a three dimensional form through the combination of the left and right stereoscopic image pairs.

In some cases, special filtering lenses may be utilized to selectively view the left and right image pairs. For example, stereoscopic viewing glasses may be utilized in this way. In one embodiment, the left and right images may be alternatively viewed at high speed so that the user perceives a stereoscopic image. In still another alternative, the viewer's eyes may be separated by a divider so that the left eye sees the left image only and right eye sees the right image only. The viewer may perceive a stereoscopic image.

While each of these techniques has various advantages, there is still the problem that they require considerable overhead. For example, special glasses must be utilized in some cases and special apparatus may be needed in others.

Thus, there is a need for better ways to stereoscopically view images.

DETAILED DESCRIPTION

Figure 1:
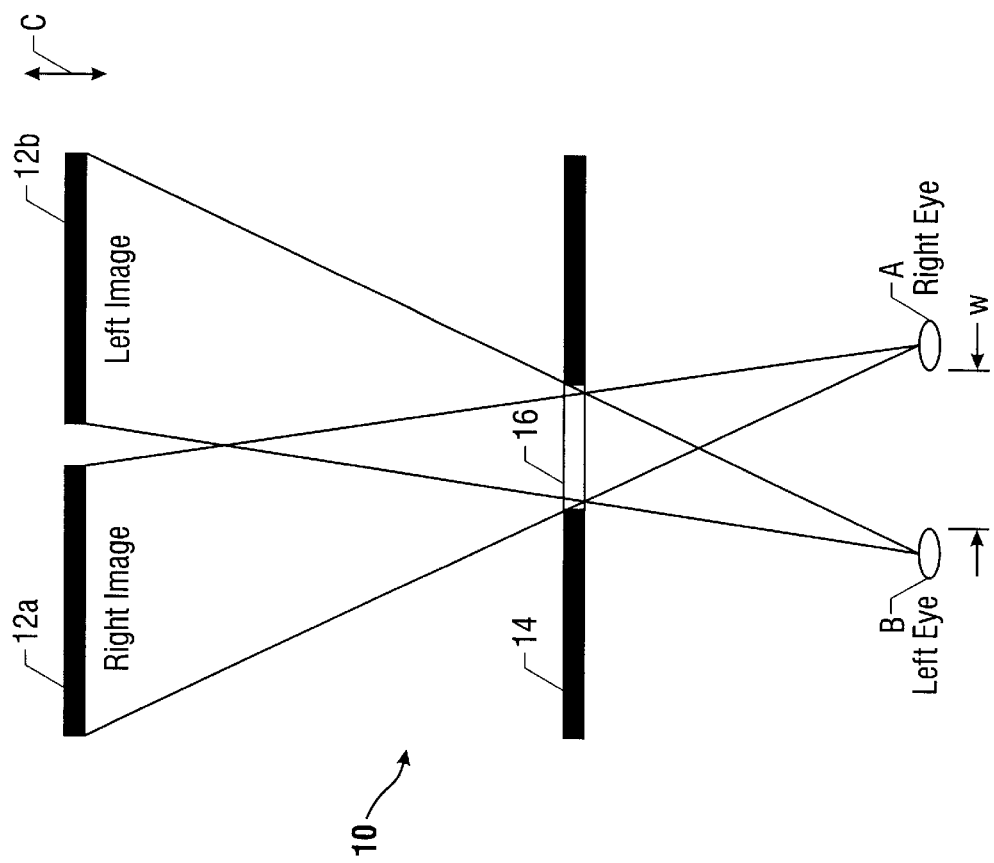
FIG. 1 is a schematic depiction of one embodiment of the present invention.

Referring to FIG. 1, a stereoscopic imaging system 10 may include a plate 14 with an aperture 16 formed therein. Stereoscopic left and right image pairs 12a and 12b may be displayed. In one embodiment, the left and right image pairs 12 may be displayed by a computer on a computer display screen such as a computer monitor. In another embodiment, the left and right image pairs may be provided in printed form. For example, the left and right image pairs may be included in a magazine, for example as part of an advertisement. Thus, the presentation of the left and right image pairs 12 is subject to considerable variation.

When the user views the left and right image pairs 12 through the aperture 16, the user perceives a stereoscopic image. The stereoscopic image may appear more lifelike or three dimensional.

Generally, it is desirable that the width of the aperture 16 be less than the spacing W between the left eye B and the right eye A of the viewer. Thus, the viewer's right eye A views the right image 12a across the angle of view of the left eye B of the left image 12b. The result is that within the aperture 16, the viewer sees a composite of the left and right images 12 that may be perceived by the viewer as a three dimensional or more lifelike image.

In some cases, the relative positions of the plate 14 and the images 12a and 12b may be adjusted as indicated by the arrows C. Thus, by appropriately positioning the viewer, the plate 14 and the images 12a and 12b, the viewer can obtain a full, undistorted image of the stereoscopic composite that results from the left and right image pairs 12.

The implementation of the plate 14 is subject to considerable variability. In one embodiment, it may be provided as an attachment to a computer display screen that positions the plate 14 at an appropriate distance from the display screen for stereoscopic viewing. As still another alternative, the plate 14 may be provided with a support or stand that enables the plate 14 to be freestanding in front of a computer display. As still another example, the plate 14 may be unconnected and may be simply held in the user's hand. Other possibilities exist as well.

Figure 2:
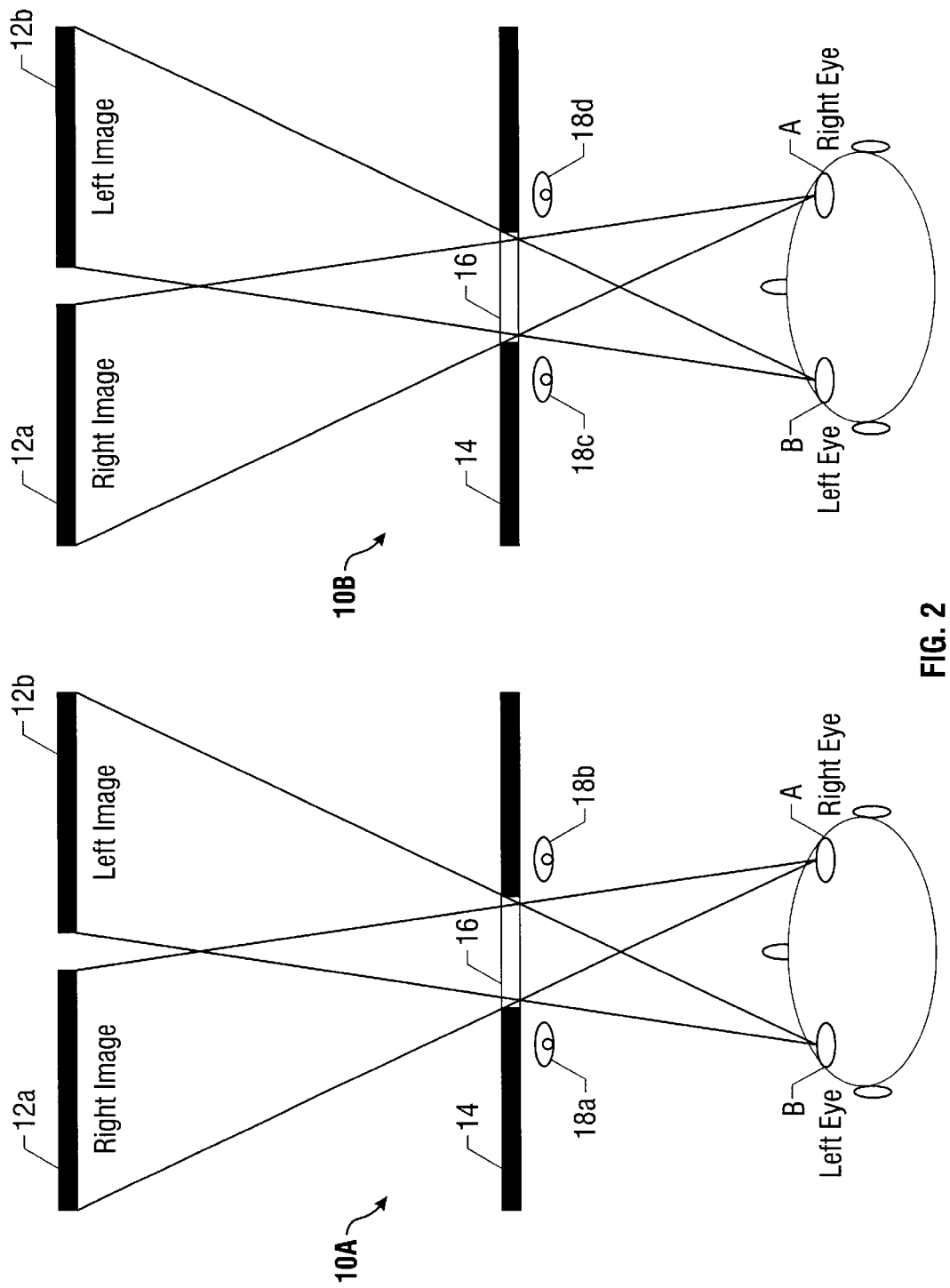
FIG. 2 is a schematic depiction of a video conferencing system in accordance with one embodiment of the present invention.

Turning next to FIG. 2, a system for enabling stereoscopic video conferencing includes a pair of systems 10a and 10b. Each system 10 includes a plate 14 with an aperture 16 that reveals a right image 12a and left image 12b. The left and right images 12 may be displayed on the display screen of a computer system.

The user's eyes are again positioned appropriately with respect to the aperture 16. However, in this embodiment, left and right cameras 18a and 18b are provided on the viewer's side of the plate 14. The cameras 18a and 18b create stereoscopic images of the viewer as the viewer looks at the images 12a and 12b. Thus, one system 10A provides left and right images 12a and 12b of a first video conference participant to a second participant while the other system 10B provides left and right images of the second video conference participant to the first participant. As a result, each viewer may view a stereoscopic depiction of another video conference participant.

By appropriately spacing the cameras 18a and 18b or 18c and 18d, left and right stereoscopic images may be generated. Again, it may be desirable that the spacing between the user's eyes A and B be greater than the width of the opening 16.

Figure 3:
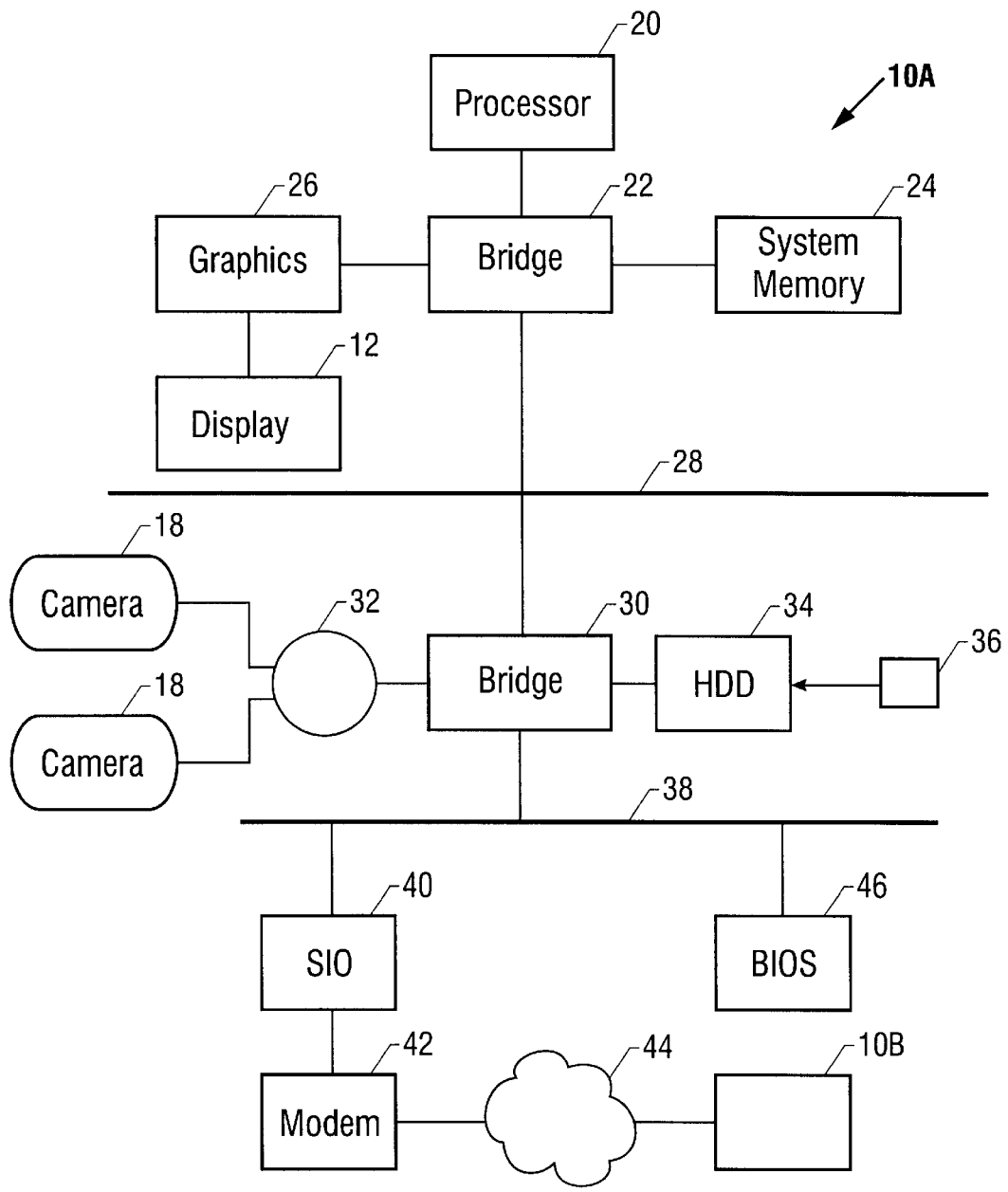
FIG. 3 is a block diagram of a system to implement the embodiment shown in FIG. 2.

Referring to FIG. 3, the system 10A in accordance with one embodiment of the present invention includes a processor 20. In the illustrated embodiment, the system 10A is shown coupled through a network 44 to the system 10B. The system 10B may be configured as depicted for one embodiment of the system 10A or in one of a variety of other conventional computer architectures.

The processor 20 may be coupled to system memory 24 through a bridge 22. The bridge 22 may in turn couple to the display 12 through a graphics adapter 26.

The bridge 22, in one embodiment, may be coupled to a bus 28 that is in turn coupled to a bridge 30. The bridge 30 may be coupled to the cameras 18 through a hub 32. For example, the hub 32 may be a Universal Serial Bus (USB) hub. Also coupled to the bridge 30 is a storage device 34 such as a hard disk drive. The storage device 34 may store the software 36.

The bridge 30 is also coupled to a bus 38. The bus 38 in turn supports the basic input/output system (BIOS) memory 46. A serial input/output (SIO) device 40, coupled to the bus 38, may also be coupled to a device 42 for connecting to a network 44. In one embodiment, the device 42 may be a modem. However, the device 42 may also be a network interface card (NIC) as another example. The network 44 may be a conventional computer network or a telephone network. The network 44 may also be the Internet as another example.

Figure 4:
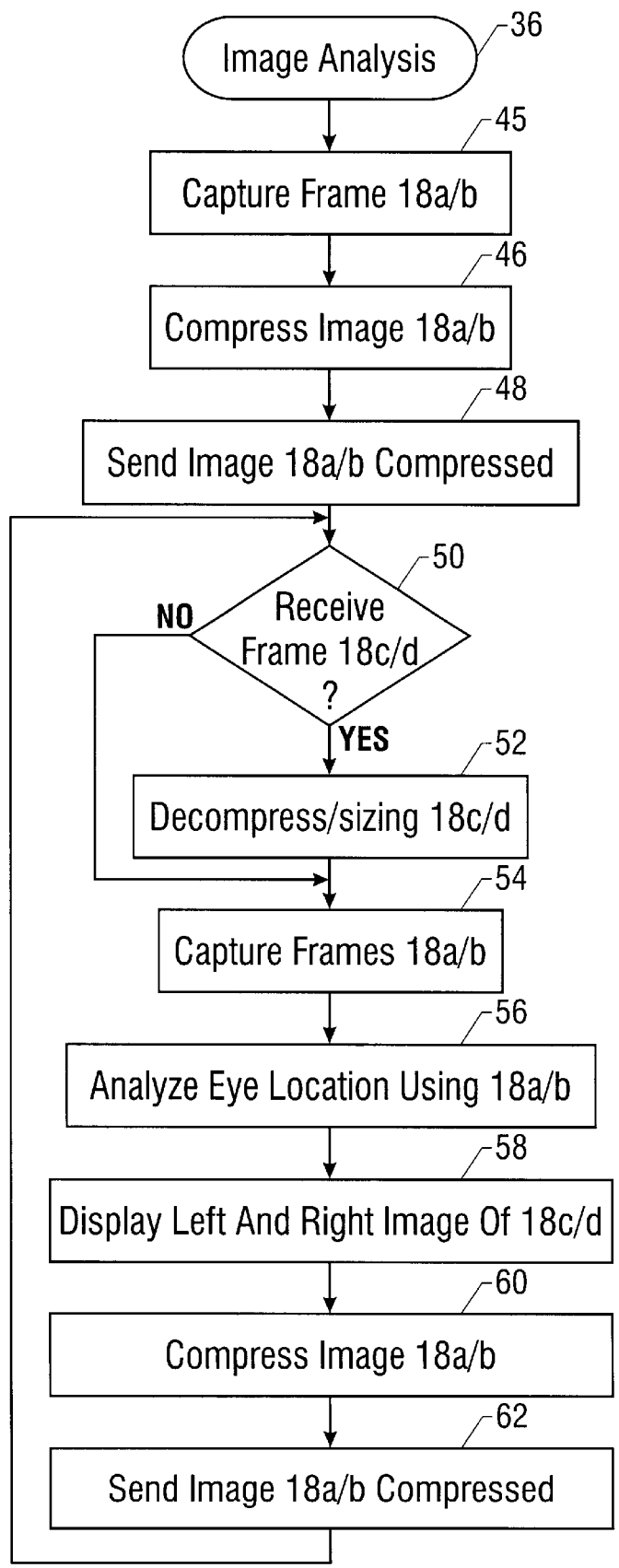
FIG. 4 is a flow chart for software for implementing the system shown in FIGS. 2 and 3.

Turning finally to FIG. 4, the software 36 in accordance with one embodiment of the present invention may enable a user participating in a video conference to move his or her head without losing the ability to view the stereoscopic image of the other participant. Software 36 on the system 10A directs the cameras 18a and 18b to capture frames as indicated in block 45. Those frames may be compressed as indicated in block 46 and transmitted to the system 10B as indicated in block 48.

A check at diamond 50 determines whether or not frames have been received from the system 10B and its cameras 18c and 18d. If so, those frames are decompressed and sized as indicated in block 52. Thereafter, additional frames from the cameras 18a and 18b may be captured as indicated in block 54 in order to allow eye or face location analysis. In block 56, the location of the user's eyes is determined from the images from the cameras 18a and 18b. Software for locating facial features using pattern recognition analysis or other techniques is well-known. The cameras 18a and 18b are utilized in one embodiment but either camera from each system 10A or 10B may be utilized for this purpose.

Thereafter, the left and right images from the cameras 18c and 18d of the system 10B are displayed on the display 12 associated with the system 10A as indicated in block 58. The frames utilized for eye location are then compressed as indicated in block 60 and sent to the system 10B as indicated in block 62.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing a first stereoscopic image pair of a first video conference participant to a second video conference participant for viewing a first video conference participant;
   providing a second stereoscopic image pair of said second video conference participant to said first video conference participant for viewing the second video conference participant; and
   using said first stereoscopic image pair to analyze the location of the eyes of said first video conference participant.

2. The method of claim 1 including providing an aperture through which to stereoscopically view the first stereoscopic image pair.

3. The method of claim 2 wherein providing an aperture includes providing an aperture that has a width less than the spacing between a user's eyes.

4. The method of claim 2 wherein providing a first stereoscopic image pair includes providing a left and right image on a computer display.

5. The method of claim 4 wherein providing a left and right image includes providing a left and right image of the first video conference participant.

6. The method of claim 5 including providing a pair of cameras to capture the first stereoscopic image pair.

7. The method of claim 6 including positioning said cameras on the side of the aperture with said first video conference participant.

8. The method of claim 7 including capturing a stereoscopic image of said first video conference participant at the same time the first video conference participant is viewing a stereoscopic image of the second video conference participant.

9. The method of claim 1 including using the position of the first video conference participant's eyes to adjust the displayed position of the stereo pair of the second video conference participant.

10. The method of claim 9 including adjusting the position of the second video conference participant image pair to enable the first video conference participant to move slightly while continuing to view the image pair of the second video conference participant.

11. A video conference system comprising:
    a processor-based device;
    a display, coupled to said processor-based device, to display a second stereoscopic image of a second video conference participant at a remote location;
    a plate having an aperture through which the second stereoscopic image may be viewed; and
    a stereoscopic imaging system that captures a first stereoscopic image of a first video conference participant viewing said second video conference participant on the display through the aperture, said system transmits said first stereoscopic image to said second video conference participant and said system also uses said first stereoscopic image to adjust said imaging system for movement of said first video conference participant.

12. The system of claim 11 wherein said stereoscopic imaging system includes a camera on both sides of said aperture to capture said first stereoscopic image of the first video conference participant viewing the display.

13. The system of claim 12 including a network connection.

14. The system of claim 11 wherein the aperture is less than the spacing between the eyes of the first video conference participant.

* * * * *